US012786136B2

(12) United States Patent
Maxwell et al.

(10) Patent No.: US 12,786,136 B2
(45) Date of Patent: *Nov. 3, 2026

(54) METHOD AND SYSTEM FOR DETERMINING TRANSFERABILITY OF RESOURCES

(71) Applicant: The Toronto-Dominion Bank, Toronto (CA)

(72) Inventors: Karen Maxwell, Toronto (CA); Amanda Buchanan, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 52 days.

This patent is subject to a terminal disclaimer.

(21) Appl. No.: 18/894,165

(22) Filed: Sep. 24, 2024

(65) Prior Publication Data

US 2025/0016113 A1 Jan. 9, 2025

Related U.S. Application Data

(63) Continuation of application No. 18/187,876, filed on Mar. 22, 2023, now Pat. No. 12,137,056.

(51) Int. Cl.

| | |
|---|---|
| ***H04L 67/53*** | (2022.01) |
| ***G06F 9/54*** | (2006.01) |
| ***H04L 41/22*** | (2022.01) |
| ***H04L 47/76*** | (2022.01) |

(52) U.S. Cl.

CPC .............. *H04L 47/76* (2013.01); *G06F 9/547* (2013.01); *H04L 41/22* (2013.01); *H04L 67/53* (2022.05)

(58) Field of Classification Search

CPC ......... H04L 47/76; H04L 41/22; H04L 67/53; G06F 9/547; G06F 9/5027; G06Q 20/10; G06Q 20/102; G06Q 20/227; G06Q 20/3223; G06Q 20/326; G06Q 20/342; G06Q 20/401; G06Q 20/409

USPC .......................................... 709/220, 224–228

See application file for complete search history.

(56) References Cited

U.S. PATENT DOCUMENTS

| | | | | |
|---|---|---|---|---|
| 8,973,819 | B2 | 3/2015 | Blackhurst et al. | |
| 9,355,392 | B2 | 5/2016 | Blackhurst et al. | |
| 9,450,700 | B1 | 9/2016 | Van Tonder et al. | |
| 9,760,978 | B1 | 9/2017 | Lu et al. | |
| 10,320,750 | B1 * | 6/2019 | Brandwine | H04L 63/1433 |

(Continued)

FOREIGN PATENT DOCUMENTS

| | | | | |
|---|---|---|---|---|
| CA | 2952882 C * | 6/2019 | | G06F 21/335 |
| CA | 3129987 A1 | 3/2022 | | |

*Primary Examiner* — Khanh Q Dinh

(74) *Attorney, Agent, or Firm* — Rowand LLP

(57) ABSTRACT

A server computer system, comprises a processor; a communications module coupled to the processor; and a memory coupled to the processor, the memory storing instructions that, when executed, configure the processor to obtain resource availability data for resources maintained by a resource provider; receive, via the communications module and from a third party server computer system, session data that includes a request to perform an operation; determine, based on the session data, that the resources are transferable to perform the operation; and responsive to determining that the resources are transferable to perform the operation, update a graphical user interface displayed on a client device to indicate that the resources are transferable to perform the operation.

20 Claims, 16 Drawing Sheets

(56) References Cited

U.S. PATENT DOCUMENTS

| | | | | |
|---|---|---|---|---|
| 10,778,691 | B1 * | 9/2020 | Kissell | H04L 63/104 |
| 10,846,115 | B1 * | 11/2020 | Bramhill | G06F 9/45558 |
| 10,922,357 | B1 * | 2/2021 | Chennuru | G06F 16/2457 |
| 11,115,301 | B1 * | 9/2021 | Margarian | G06F 11/3409 |
| 11,243,756 | B1 * | 2/2022 | Hussain | H04L 43/0876 |
| 11,468,381 | B1 * | 10/2022 | Harris | G06F 16/9035 |
| 11,481,758 | B1 | 10/2022 | Liu | |
| 11,496,411 | B1 * | 11/2022 | Kim | H04L 47/82 |
| 11,552,971 | B1 * | 1/2023 | Karak | G06N 20/00 |
| 11,575,730 | B1 * | 2/2023 | Britt | H04L 41/0895 |
| 11,848,423 | B2 * | 12/2023 | Magagnin | H01M 10/05 |
| 11,869,070 | B2 | 1/2024 | Kade et al. | |
| 12,137,056 | B2 * | 11/2024 | Maxwell | G06Q 20/102 |
| 12,518,023 | B1 * | 1/2026 | Guo | G06F 21/577 |
| 2009/0048924 | A1 | 2/2009 | Wiborg et al. | |
| 2012/0173612 | A1 | 7/2012 | Vegesna-Venkata et al. | |
| 2013/0103641 | A1 * | 4/2013 | Rehman | H04L 43/045<br>707/769 |
| 2013/0151401 | A1 | 6/2013 | Scipioni et al. | |
| 2014/0081852 | A1 | 3/2014 | Blackhurst et al. | |
| 2017/0324610 | A1 | 11/2017 | Blattmann et al. | |
| 2018/0276699 | A1 | 9/2018 | Leekkala et al. | |
| 2019/0245943 | A1 * | 8/2019 | Dukhovny | H04L 41/0253 |
| 2020/0104829 | A1 | 4/2020 | Arora et al. | |
| 2020/0244581 | A1 * | 7/2020 | Chunduru Venkata | G06F 9/547 |
| 2022/0060430 | A1 * | 2/2022 | Milton | G06Q 20/227 |
| 2023/0025530 | A1 * | 1/2023 | Seibel | H04L 47/82 |
| 2023/0130001 | A1 * | 4/2023 | Kim | B60W 40/06<br>73/65.01 |

* cited by examiner

METHOD AND SYSTEM FOR DETERMINING TRANSFERABILITY OF RESOURCES

CROSS-REFERENCE TO RELATED APPLICATIONS

This application is a continuation of U.S. patent application Ser. No. 18/187,876, filed Mar. 22, 2023, the entire contents of which are incorporated herein by reference.

TECHNICAL FIELD

The present application relates to methods and systems for determining transferability of resources.

BACKGROUND

In a computer network, operations may be performed to share or transfer resources between nodes of a network. For example, operations may be performed to transfer computing resources, such as processing units, memory, etc. between nodes to attain a desired distribution of resources for a computer network.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
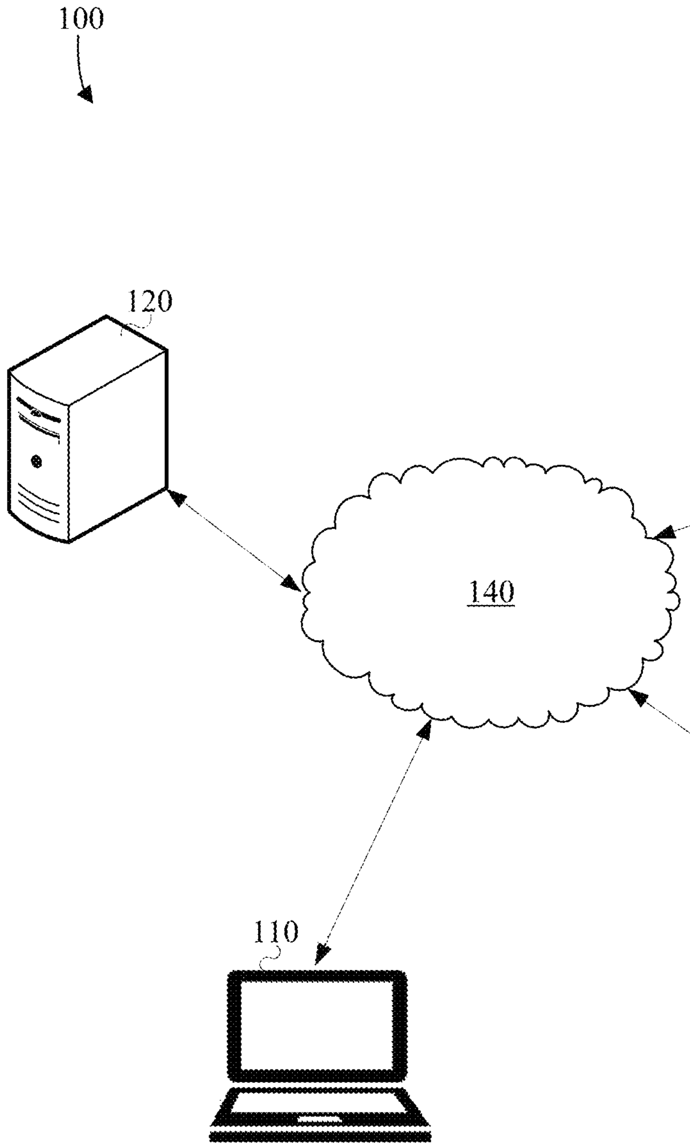
FIG. 1 is a schematic operation diagram illustrating an operating environment of an example embodiment.

Accordingly, in one aspect there is provided a server computer system, comprising a processor; a communications module coupled to the processor; and a memory coupled to the processor, the memory storing instructions that, when executed, configure the processor to obtain resource availability data for resources maintained by a resource provider; receive, via the communications module and from a third party server computer system, session data that includes a request to perform an operation; determine, based on the session data, that the resources are transferable to perform the operation; and responsive to determining that the resources are transferable to perform the operation, update a graphical user interface displayed on a client device to indicate that the resources are transferable to perform the operation.

In one or more embodiments, the session data is received by way of a first application programming interface redirect initiated by the third party server computer system.

In one or more embodiments, the resource availability data is obtained by way of a second application programming interface associated with the resource provider.

In one or more embodiments, the instructions, when executed, further configure the processor to receive, from the client device, a signal that includes an identifier for obtaining the resource availability data from the resource provider.

In one or more embodiments, when updating the graphical user interface displayed on the client device to indicate that the resources are transferable to perform the operation, the instructions, when executed, further configure the processor to enable a selectable option for transferring the resources to perform the operation.

In one or more embodiments, the instructions, when executed, further configure the processor to responsive to receiving the session handoff that includes the request to perform the operation, obtain updated resource availability data from the resource provider to determine that resources are available to perform the operation.

In one or more embodiments, when determining that resources are transferable to perform the operation, the instructions, when executed, further configure the processor to analyze the session data to obtain an identifier associated with the session data; analyze the resource availability data to obtain an identifier associated with the resource availability data; and determine that the resources are transferable to perform the operation based on the identifier associated with the session data and the identifier associated with the resource availability data.

In one or more embodiments, the instructions, when executed, further configure the processor to consult a database to determine that the resources are transferable to perform the operation based on the identifier associated with the session data and the identifier associated with the resource availability data.

In one or more embodiments, the request to perform the operation includes a request to transfer resources from an account that is not associated with the resource provider to an account that is associated with the third party server computer system.

In one or more embodiments, the request to perform the operation includes a pay-by-bank request.

In one or more embodiments, performing the operation includes performing operations to transfer at least a portion of the resources from a data record maintained by the resource provider to a data record maintained by the third party server computer system.

According to another aspect there is provided a computer-implemented method, comprising obtaining resource availability data for resources maintained by a resource provider; receiving, from a third party server computer system, session data that includes a request to perform an operation; determining, based on the session data, that the resources are transferable to perform the operation; and responsive to determining that the resources are transferable to perform the operation, updating a graphical user interface displayed on a client device to indicate that the resources are transferable to perform the operation.

In one or more embodiments, the session data is received by way of a first application programming interface redirect initiated by the third party server computer system.

In one or more embodiments, the resource availability data is obtained by way of a second application programming interface associated with the resource provider.

In one or more embodiments, the method further comprises receiving, from the client device, a signal that includes an identifier for obtaining the resource availability data from the resource provider.

In one or more embodiments, when updating the graphical user interface displayed on the client device to indicate that the resources are transferable to perform the operation, the method further comprises enabling a selectable option for transferring the resources to perform the operation.

In one or more embodiments, the method further comprises responsive to receiving the session handoff that includes the request to perform the operation, obtaining updated resource availability data from the resource provider to determine that resources are available to perform the operation.

In one or more embodiments, when determining that resources are transferable to perform the operation, the method further comprises analyzing the session data to obtain an identifier associated with the session data; analyzing the resource availability data to obtain an identifier associated with the resource availability data; and determining that the resources are transferable to perform the operation based on the identifier associated with the session data and the identifier associated with the resource availability data.

In one or more embodiments, the method further comprises consulting a database to determine that the resources are transferable to perform the operation based on the identifier associated with the session data and the identifier associated with the resource availability data.

According to another aspect there is provided a non-transitory computer readable storage medium comprising processor-executable instructions which, when executed, configure a processor to obtain resource availability data for resources maintained by a resource provider; receive, via a communications module and from a third party server computer system, session data that includes a request to perform an operation; determine, based on the session data, that the resources are transferable to perform the operation; and responsive to determining that the resources are transferable to perform the operation, update a graphical user interface displayed on a client device to indicate that the resources are transferable to perform the operation.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

FIG. 1 is a block diagram illustrating an operating environment of an example embodiment. Various components cooperate to provide a system 100 which may be used, for example, to determine the transferability of resources. As shown, the system 100 includes a client device 110, a server computer system 120 and a third party server computer system 130 coupled to one another through a network 140.

The client device 110 is configured to communicate with the server computer system 120 and the third party server computer system 130 via the network 140 and vice-versa. The client device 110 may be remote from the server computer system 120 and the third party server computer system 130.

The server computer system 120 is configured to communicate with the third party server computer system 130 via the network 140 and vice-versa. In one or more embodiments, the server computer system 120 may engage an application programming interface (API) that may be used to communicate with the third party server computer system 130 and vice-versa. The server computer system 120 may be remote from the third party server computer system 130.

The client device 110 may be a laptop computer as shown in FIG. 1. However, the client device 110 may be a computing device of another type such as for example a mobile device, a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 may be referred to as a transfer server and may be configured to complete transfers according to transfer requests. In at least some embodiments, the server computer system 120 may transfer computing resources between different nodes in a computer network. In at least some embodiments, the server computer system 120 may be a financial institution server. In these embodiments, the server computer system 120 may maintain a database that includes various data records. A data record may, for example, reflect an amount of value stored in a particular account. The transfers may be completed by transferring value from a particular account maintained by the server computer system 120.

Each account maintained by the server computer system 120 may be associated with authentication information. The authentication information may be or may include any one or more of a token, a username, a password, a personal identification number (PIN), biometric data, etc. The authentication information may be used by the server computer system 120 to authenticate a device such as for example the client device 110. More specifically, the authentication information may be used to determine that the client device 110 is being operated by an authorized user and to identify the one or more accounts the user is trying to access.

The server computer system 120 may receive requests from the third party server computer system 130. For example, in one or more embodiments, the third party server computer system 130 may communicate requests to the server computer system 120 that may include a request for computing resources. In these embodiments, the server computer system 120 may be referred to as a hypervisor or virtual machine monitor and may manage computer resource allocation in response to requests received from the third party server computer system 130.

The third party server computer system 130 may be maintained by a third party that does not maintain the server computer system 120. For example, in one or more embodiments, the third party server computer system 130 may be associated with a merchant and/or an e-commerce platform. The third party server computer system 130 may communicate session data to the server computer system 120. The session data may include a request that the server computer system 120 perform an operation. The request to perform the operation may be, for example, a transfer request. The session data may additionally include information such as for example an identifier of the merchant or the e-commerce platform. As will be described in more detail, in one or more embodiments, the third party server computer system 130 may engage an API and may communicate session data to the server computer system 120 by way of an API redirect.

The network 140 is a computer network. The network 140 may include a public network such as the Internet and/or a private network. In some embodiments, the network 140 may be an internetwork such as may be formed of one or more interconnected computer networks. For example, the network 140 may be or may include an Ethernet network, a wireless network, a telecommunications network, or the like.

In one or more embodiments, the system 100 may include additional server computer systems. For example, the system 100 may additionally include a server computer system associated with a resource provider which may be referred to as a resource provider server computer system 150. The resource provider server computer system 150 may be configured to communicate with the client device 110, the server computer system 120 and the third party server computer system 130 via the network 140 and vice-versa. The resource provider server computer system 150 may be remote from the client device 110, the server computer system 120 and the third party server computer system 130.

The resource provider server computer system 150 may maintain a database that includes resource availability data. The resource availability data may be stored in the database in association with an identifier. The identifier may be used to obtain resource availability data.

In one or more embodiments, the resource availability data may include resource availability data for one or more computing resources that are maintained by the resource provider server computer system 150. Example computing resources include virtual processors, where each virtual processor may be identified using an identifier. The resource availability data may include data indicating the availability of one or more computing resources provided by the virtual processors. For example, the resource availability data may include data indicating an amount of processing resources available to be used.

In one or more embodiments, the resource availability data may include an amount of resources available to be transferred. For example, the resource provider server computer system 150 may receive a request for resource availability data that includes an identifier. The resource provider server computer system 150 may perform a lookup using the identifier to determine an amount of resources available. Similarly, the resource provider server computer system 150 may receive a request to transfer a particular amount of resources that includes an identifier. The resource provider server computer system 150 may perform a lookup using the identifier to determine that the particular amount of resources are available and, if they are available, may perform operations to transfer the particular amount of resources. The amount of resources remaining may be updated based on the amount of resources transferred out and this may be done by subtracting the amount of resources transferred out from the amount of resources that were available.

In one or more embodiments, the resources available to be transferred may be a dollar amount associated with a stored value card such as for example a gift card. In these embodiments, the identifier may be an account identifier or a gift card identifier that may be used to determine the amount of resources available to be used or spent.

The resource provider may provide resources such as for example computing resources to the server computer system 120 and/or the third party server computer system 130 and this may be done in response to a request received from the third party server computer system 130. Put another way, the third party server computer system 130 may communicate session data to the server computer system 120 that includes a request to perform an operation. The operation may include transferring resources maintained by the resource provider server computer system 150.

In one or more embodiments, the server computer system 120 may engage an application programming interface associated with the resource provider to obtain resource availability data from the resource provider server computer system 150.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

The server computer system 120, the third party server computer system 130 and the resource provider server computer system 150 are computer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

Figure 2:
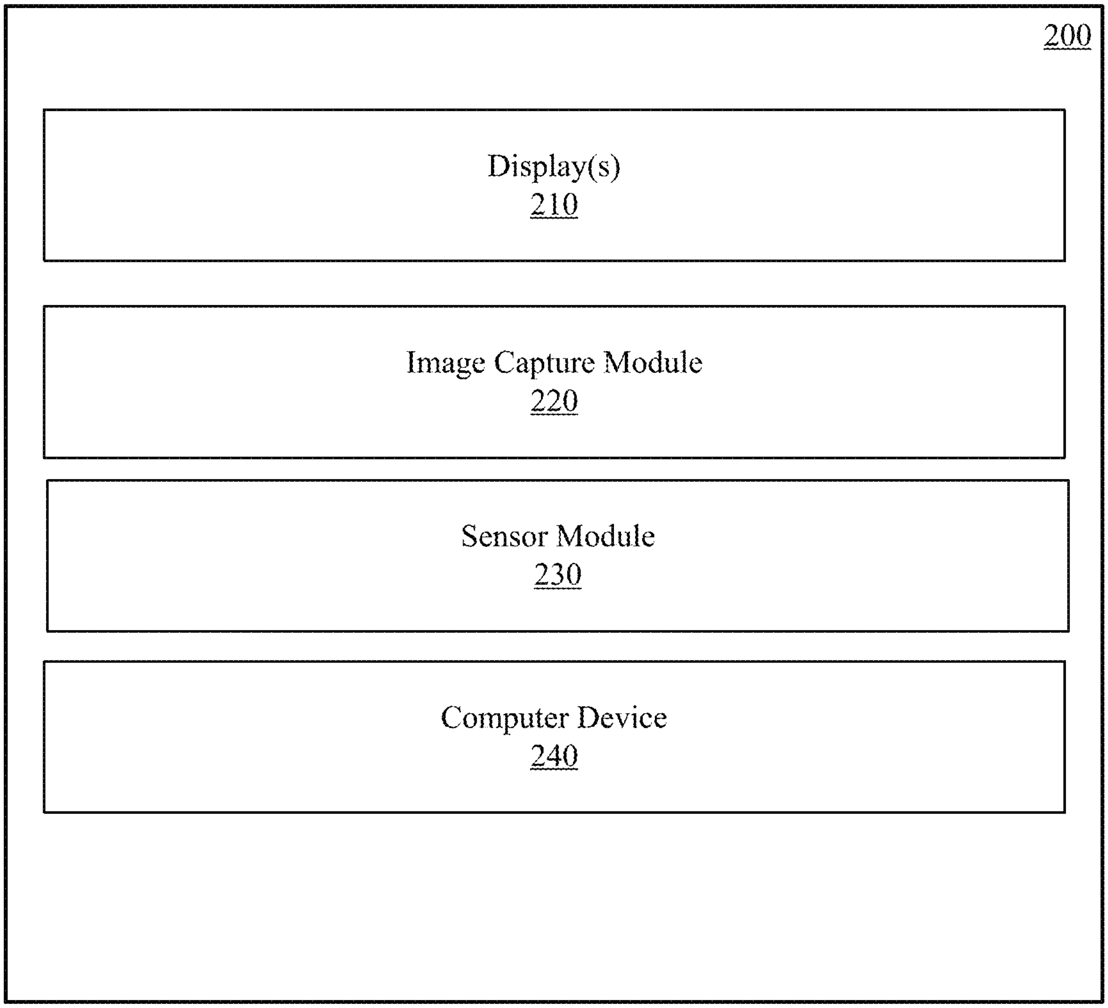
FIG. 2 is a simplified schematic diagram showing components of a computing device.

FIG. 2 is a simplified schematic diagram showing components of an exemplary computing device 200. The client device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
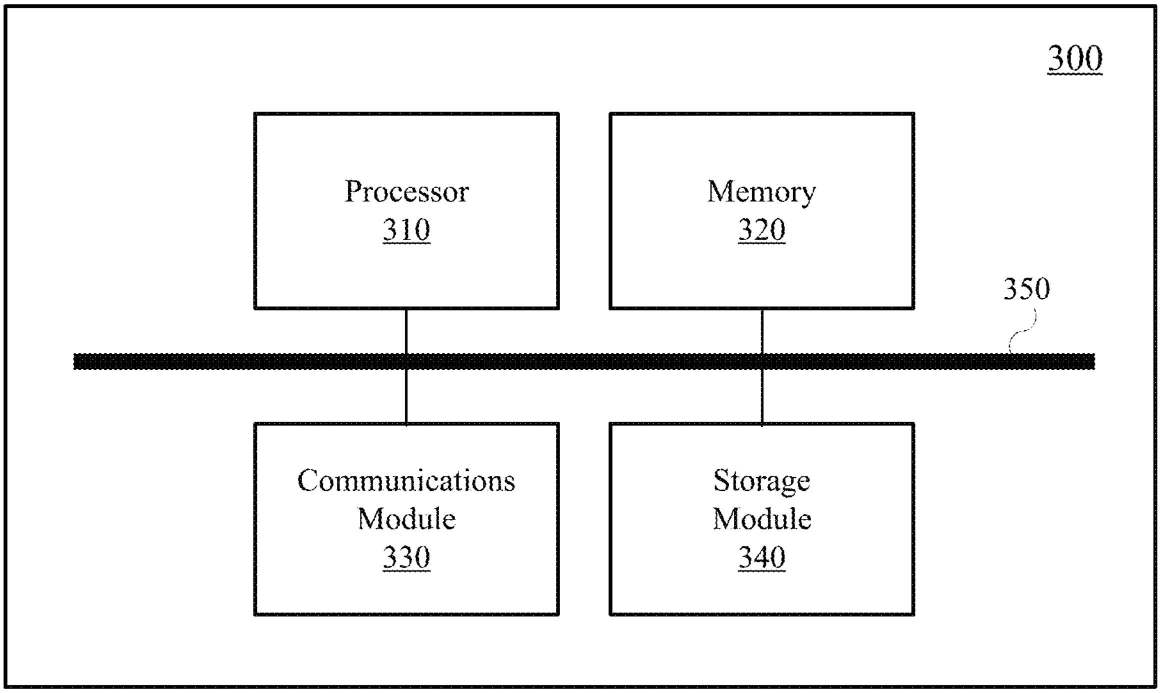
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server computer system 120 and/or the third party server computer system 130.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
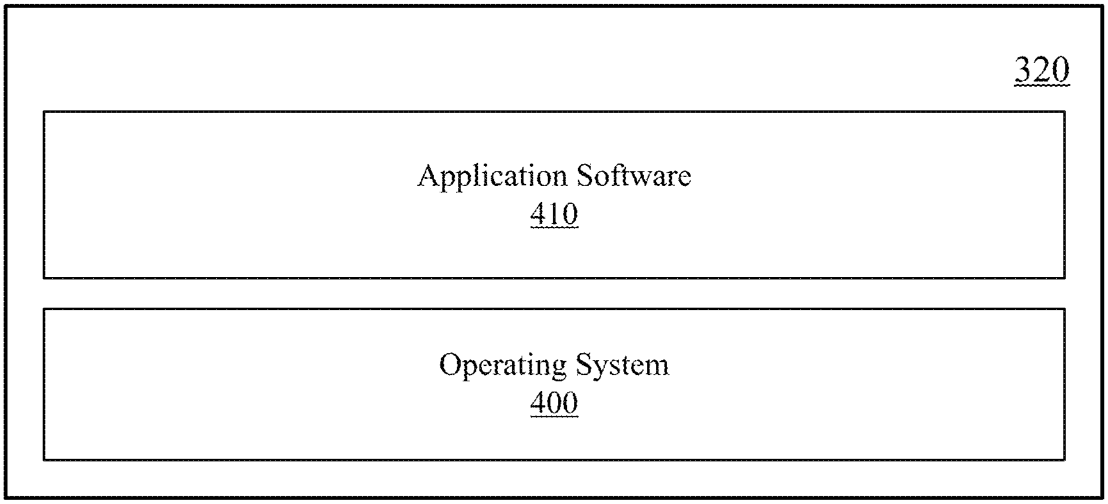
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the server computer system 120, the third party server computer system 130 and/or the resource provider server computer system 150.

While a single application 410 is illustrated in FIG. 4, in operation the memory 320 may include more than one application 410 and different applications 410 may perform different operations. For example, in at least some embodiments in which the computer device 300 functions as the client device 110, the applications 410 may include a banking application. The banking application may be configured for secure communications with the server computer system

120 and may provide various banking functions such as, for example, the ability to display a quantum of value in one or more data records (e.g., display balances), configure or request that operations such as transfers of value (e.g., bill payments, email money transfers and other transfers) be performed, and other account management functions. For example, the banking application may be configured to authenticate the user to authorize a transfer request that defines a transfer amount and to define instructions based on session data.

By way of further example, in at least some embodiments in which the computer device 300 functions as the client device 110, the applications 410 may include a web browser, which may also be referred to as an Internet browser. In at least some such embodiments, the server computer system 120 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g., display balances), configure or request that operations such as transfers of value (e.g. bill payments and other transfers) be performed, and other account management functions. For example, the banking interface may be configured to authenticate the user to authorize a transfer request that defines a transfer amount and to define instructions based on session data.

Further, as mentioned, in at least some embodiments the third party server computer system 130 may be associated with a merchant and/or an e-commerce platform. In these embodiments, the third party server computer system 130 may be a web server. The web server may cooperate with the web browser and may serve as an interface when the interface is requested through the web browser. For example, the web browser may serve as an e-commerce interface for the merchant. The e-commerce interface may enable a user operating the client device 110 to shop for one or more products or services and to complete a purchase for the one or more products or services.

In one or more embodiments, the user may operate the client device 110 to select one or more items for purchase on an e-commerce interface provided by the third party server computer system 130. During the e-commerce experience, such as for example during a checkout experience, the third party server computer system 130 may cause the client device 110 to present an interface that includes a selectable option to initiate pay-by-bank. In response to selection of the selectable option, the third party server computer system 130 may cause the client device 110 to present an interface that includes a list of financial institutions that are available for pay-by-bank. Each financial institution displayed on the user interface may be selectable by the user. The user may select their financial institution and in response the third party server computer system 130 may perform operations to redirect or handoff the session to the server computer system associated with the selected financial institution. The server computer system may include the server computer system 120 described herein.

In response to selection of the financial institution, the server computer system 120 may require authentication of the client device 110. As such, the server computer system 120 may perform operations that cause the client device 110 to request authentication information. The authentication information may be or may include any one or more of a token, a username, a password, a personal identification number (PIN), biometric data, etc. The authentication information may be used by the server computer system 120 to authenticate the client device 110. More specifically, the authentication information may be used to determine that the client device 110 is being operated by an authorized user and to identify an account for the transfer.

To redirect or handoff the session to the server computer system 120, the third party server computer system 130 may engage an application programming interface (API) and the API may be associated with the server computer system 120. The API may be engaged by initiating an API call that includes at least session data. In one or more embodiments, the session data may identify the one or more items selected by the user. The session data may include additional data such as for example attributes of the one or more items where the attributes may include a price of the one or more items. The session data may additionally include pay-by-bank data such as for example account details of an account associated with the merchant that is to receive a pay-by-bank transfer. The third party server computer system 130 may perform operations to complete an API redirect to the server computer system 120 and in this manner the session is redirected to the server computer system 120. The API redirect may be completed prior to authentication of the client device 110 or after authentication of the client device 110. After successful authentication of the client device 110 and completion of the API redirect, the server computer system 120 may perform computer operations to determine transferability of resources.

As mentioned, in one or more embodiments, the server computer system 120 may be referred to as a hypervisor or virtual machine monitor and may manage computer resource allocation in response to requests received from the third party server computer system 130. For example, in one or more embodiments, the third party server computer system 130 may communicate requests to the server computer system 120 that may include a request for computing resources. In response, the server computer system 120 may perform computer operations to determine transferability of resources. The resources may include computer resources associated with the resource provider server computer system 150.

Figure 5:
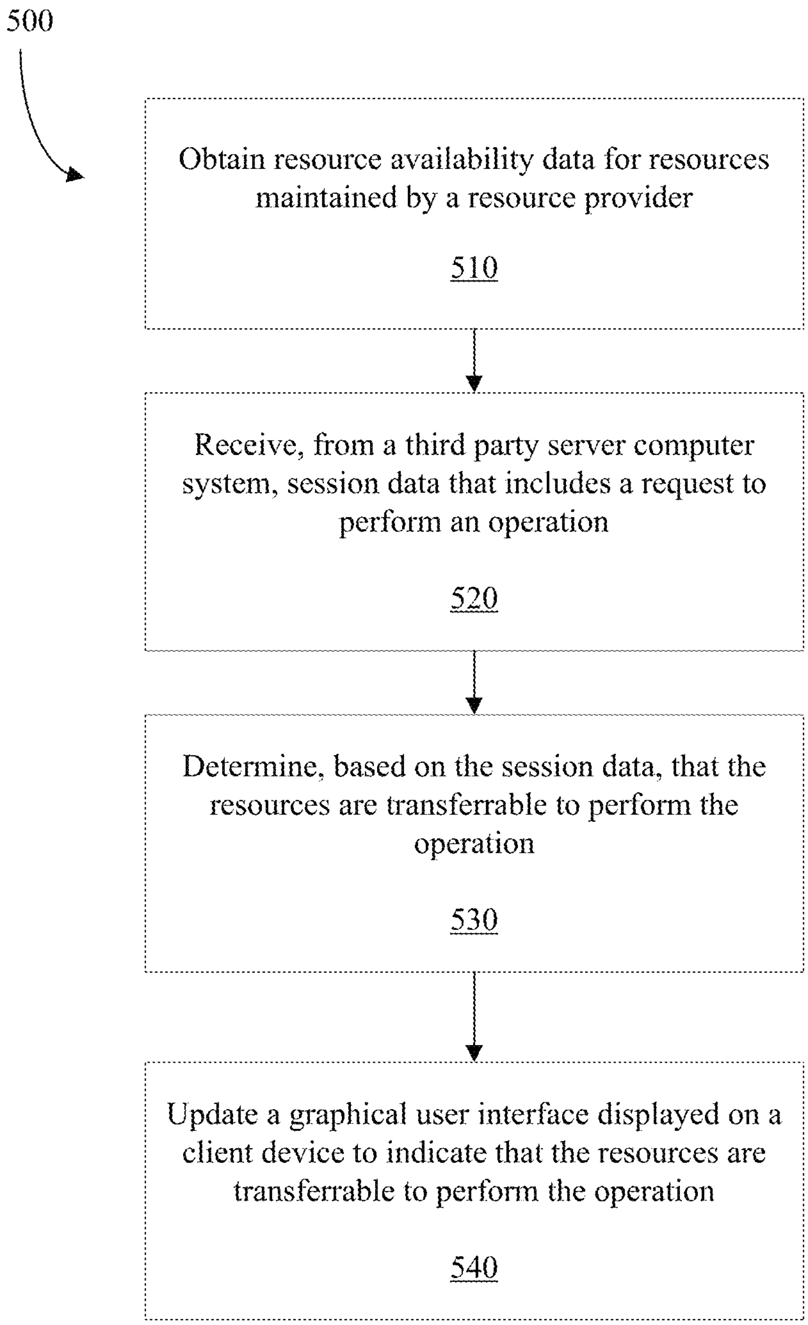
FIG. 5 is a flowchart showing operations performed by a server in determining transferability of resources according to an embodiment.

FIG. 5 is a flowchart showing computer operations of a method 500 which may be performed by the server computer system 120 to determine transferability of resources. For example, computer-executable instructions stored in memory of the server computer system 120 may, when executed by one or more processors, configure the server computer system 120 to perform the method 500 or a portion thereof. The server computer system 120 may offload some of the operations to the client device 110, the third party server computer system 130 and/or the resource provider server computer system 150.

The method 500 includes obtaining resource availability data for resources maintained by a resource provider (step 510).

In one or more embodiments, the server computer system 120 may send a signal to the resource provider server computer system 150 that includes a request to obtain resource availability data. The signal may be sent directly to the resource provider server computer system 150 or may be sent by way of an application programming interface associated with the resource provider.

The server computer system 120 may obtain the resource availability data in response to receiving a signal that includes a request to obtain the resource availability data. For example, a user may operate the client device 110 within, for example, a mobile application and may select a selectable option to obtain the resource availability data. In this example, the user may be prompted to enter an identifier for obtaining the resource availability data. The user may enter the identifier and in response the server computer system 120 may receive, from the client device 110, a signal that includes the identifier for obtaining the resource availability data from the resource provider.

To obtain the resource availability data using the identifier, the server computer system 120 may send a signal to the resource provider server computer system 150 that includes a request to obtain the resource availability data and the identifier. In response to receiving the request, the resource provider server computer system 150 may obtain the resource availability data by performing, for example, a lookup using the identifier. In this example, the resource provider server computer system 150 may send a signal to the server computer system 120 that includes the resource availability data. The resource availability data obtained by the server computer system 120 may be stored in a database in association with an account of the user. For example, the user may have a bank account maintained by a financial institution associated with the server computer system 120 and as such the resource availability data may be stored in association with the bank account. The user may view the resource availability data by logging into their bank account using, for example, a mobile application or a website. In this manner, the resource availability data may be linked to the bank account of the user.

In one or more embodiments, more than one identifier may be received and the server computer system 120 may obtain resource availability data for each identifier. In these embodiments, the server computer system 120 may analyze the identifier to identify a resource provider associated with the identifier. The server computer system 120 may then select an appropriate application programming interface (API) for each identified resource provider. For example, it may be that a first identifier identifies a first gift card provider and a second identifier identifies a second gift card provider. The first gift card provider may include an agnostic gift card provider, that is, a gift card that may be used at any merchant. The second gift card provider may include a merchant specific gift card provider, that is, a gift card that can only be used at a particular merchant. The server computer system 120 may select an API associated with the first gift card provider to obtain resource availability data using the first identifier and may select an API associated with the second gift card provider to obtain resource availability data using the second identifier. In this manner, the server computer system 120 may obtain resource availability data from multiple resource providers.

In one or more embodiments, the server computer system 120 may obtain resource availability data for computer resources maintained by the resource provider server computer system 150. For example, the server computer system 120 may determine resource availability data for all computer resources available to a network and this may be obtained from the resource provider server computer system 150. As mentioned above, example computer resources include virtual processors and the resource availability data may include data indicating an amount of processing resources available to be used.

The method 500 includes receiving, from a third party server computer system, session data that includes a request to perform an operation (step 520).

In one or more embodiments, the session data may be received during a session handoff by way of an API redirect initiated by the third party server computer system 130. For example, as mentioned above, the third party server computer system 130 may engage an API that may be associated with the server computer system 120. The API may be engaged by initiating an API call that includes session data. The third party server computer system 130 may perform operations to complete an API redirect to the server computer system 120 and in this manner the completion of the transfer is redirected to the server computer system 120. The API redirect may be completed prior to authentication of the client device 110 or after authentication of the client device 110. In these embodiments, the session handoff may be initiated in response to a pay-by-bank request.

In one or more embodiments, the session handoff may be received directly from the third party server computer system 130. For example, the third party server computer system 130 may store, in a database, protocol information that may be used to generate the session handoff in a format that is compliant with requirements of the server computer system 120. In this example, in response to selection of the financial institution associated with the server computer system 120, the third party server computer system 130 may consult the database to determine the format that is compliant with requirements of the server computer system 120 and may generate the session handoff accordingly.

In another example, the third party server computer system 130 may request the format from a dedicated server computer system that may be associated with another third party. The dedicated server computer system may be available to any requesting party (such as the third party server computer system 130) and may provide the requesting party with the format complaint with any particular financial institution. In this example, in response to selection of the financial institution associated with the server computer system 120, the third party server computer system 130 may obtain the format that is compliant with requirements of the server computer system 120 from the dedicated server computer system and may generate the session handoff accordingly.

The session handoff includes session data. The session data includes a request to perform an operation. In one or more embodiments, the request to perform the operation may include a request to transfer resources from an account that is not associated with the resource provider to an account that is associated with the third party server computer system 130.

The request to perform the operation may include, for example, a request to transfer one or more computing resources. For example, the request to perform the operation may include a request to connect to one or more virtual processors that may be available. The session data may include an identifier of the one or more virtual processors that are being requested.

The request to perform the operation may include, for example, a pay-by-bank request. In this example, performing the operation may include performing operations to transfer at least a portion of the resources from a data record maintained by the resource provider to a data record maintained by the third party server computer system 130.

As mentioned, in one or more embodiments, the session data may include a pay-by-bank request to purchase the one or more items by transferring resources from an account maintained by the server computer system 120 (and associated with the user of the client device 110) to an account associated with the merchant of the third party server computer system 130.

An identifier may be associated with the session data that may be used to identify, for example, a merchant associated with the third party server computer system 130. For example, an identifier associated with the session data may identify a merchant that is requesting the transfer of resources to complete a purchase via pay-by-bank.

In one or more embodiments, responsive to receiving the session handoff, the server computer system 120 may perform operations to obtain updated resource availability data from the resource provider server computer system 150 to determine that resources are available to perform the operation. In these embodiments, the server computer system 120 may determine, based on the updated resource availability data, that resources are available to perform the operation before continuing to step 530.

The method 500 includes determining, based on the session data, that the resources are transferable to perform the operation (step 530).

Determining that the resources are transferable to perform the operation is different than determining that resources are available to perform the operation. Specifically, determining that resources are transferable includes determining whether or not resources maintained by the resource provider may be transferred to the third party server computer system 130. Determining that resources are available to perform the operation includes determining whether or not resources maintained by the resource provider are available to be transferred to the third party server computer system 130.

In one or more embodiments, the server computer system 120 may analyze the session data to obtain an identifier associated therewith. The server computer system 120 may analyze the resource availability data to obtain an identifier associated therewith. The server computer system 120 may determine that the resources are transferable to perform the operation based on the identifier associated with the session data and the identifier associated with the resource availability data.

In one or more embodiments, the server computer system 120 may consult a database to determine that the resources are transferable to perform the operation. For example, a database may be maintained that may be used to determine whether or not resources maintained by the resource provider may be transferred to the third party server computer system 130.

As one example, the identifier associated with the session data may identify a merchant and the identifier associated with the resource availability data may identify a gift card of a particular type. As such, the server computer system 120 may determine that the merchant accepts the gift card of the particular type and this may be done by consulting a database, for example. In one or more embodiments, the resource availability data may identify a merchant specific gift card and the server computer system 120 may determine that the merchant identified by the session data is the same merchant that is specific to the gift card. In one or more embodiments, the resource availability data may identify an agnostic gift card and the server computer system 120 may determine that the merchant accepts the agnostic gift card.

In one or more embodiments, determining that the resources are transferable to perform the operation may include determining whether or not the third party server computer system 130 is eligible to access the resources. For example, a request may be received to transfer computing resources such as for example one or more particular virtual processors to the third party server computer system 130. In this example, a network may include three (3) virtual processors and the third party server computer system 130 may only be allowed to access the virtual processors provided that the third party server computer system 130 is not already accessing any of the virtual processors by way of another request. Put another way, if computing resources were transferred to the third party server computer system 130 in response to a different request, and the third party server computer system 130 is currently (or still) accessing these computing resources, then the server computer system 120 may determine that the resources are not transferable to the third party server computer system 130.

The method 500 includes updating a graphical user interface displayed on a client device to indicate that resources are transferable to perform the operation (step 540).

Responsive to determining that resources are transferable to perform the operation, the server computer system 120 updates a graphical user interface displayed on the client device 110 to indicate that resources are transferable to perform the operation. For example, updating the graphical user interface may include enabling a selectable option for transferring the resources to perform the operation. In this manner, the graphical user interface may be updated to indicate that resources provided by the resource provider are transferable to perform the operation and to enable a selectable option that, when selected, causes the server computer system 120 to perform operations to transfer the resources.

In one or more embodiments, the operations that may be performed to transfer the resources may include connecting one or more virtual processors to the third party server computer system 130.

In one or more embodiments, the server computer system 120 may verify an authentication status of the client device 110 prior to performing the operation. For example, the server computer system 120 may determine whether or not the client device 110 has been successfully authenticated. If the client device 110 has not been authenticated, the server computer system 120 may perform operations that cause the client device 110 to request authentication information. The authentication information may be or may include any one or more of a token, a username, a password, a personal identification number (PIN), biometric data, etc. The authentication information may be used by the server computer system 120 to authenticate the client device 110. Once the authentication status of the client device 110 has been verified, the server computer system 120 may perform the operation defined in the session data.

In one or more embodiments where the instructions define a transfer request, the server computer system 120 may perform an operation that includes transferring resources from the resource provider to the third party server computer system 130.

In one or more embodiments, the server computer system 120 may perform a pay-by-bank operation to complete the transfer. Performing the pay-by-bank operation to complete the transfer may include performing operations to transfer an amount of resources maintained by the resource provider to an account associated with the third party server computer system 130.

In one or more embodiments, the server computer system 120 may send a request to transfer resources to the resource provider server computer system 150. The request to transfer resources may include an account of the merchant which may be obtained by the server computer system 120 from the session data. For example, in embodiments where the operation includes a pay-by-bank operation, the session data may include an identity of the merchant and may include a resource account number of the merchant. As such, the server computer system 120 may communicate a request to transfer resources to the resource provider server computer system 150 that includes an identifier and that includes the resource account number of the merchant. In response, the resource provider server computer system 150 may perform a lookup using the identifier to determine that the particular amount of resources are available and may perform operations to transfer resources to the resource account of the merchant. The amount of resources remaining may be updated by the resource provider server computer system 150 based on the amount of resources transferred out and this may be done by subtracting the amount of resources transferred out from the amount of resources that were available.

In one or more embodiments, resources transferred to the third party server computer system 130 may be received such that the appear to be from an account maintained by the server computer system 120 when, in fact, at least some of the resources may be received from the resource provider server computer system 150. For example, the resource provider server computer system 150 may maintain gift cards. To complete the operation, the server computer system 120 may transfer resources from a resource account such as for example a chequing account maintained thereby. The server computer system 120 may then perform operations to transfer resources from the gift card to the chequing account to reimburse the chequing account for at least a portion of the transfer.

In one or more embodiments, the amount of resources available to be transferred from the resource provider may not be sufficient to complete the transfer. In these embodiments, a first amount of resources may be transferred from the resource provider and a second amount of resources may be transferred from an account maintained by the server computer system 120. For example, the session data may request payment for $80. The server computer system 120 may obtain, from the resource provider, resource availability data that indicates that a gift card has a $50 balance. As such, the server computer system 120 may perform operations to redeem the $50 gift card and may prompt a user of the client device 110 to select a bank account to transfer the outstanding $30.

In one or more embodiments, it may be determined that no resource are transferrable from the resource provider server computer system 150 to perform the operation, such as for example during step 530 of the method 500 described herein. In these embodiments, it may be that resources maintained by the server computer system 120 are available to be transferred and as such the server computer system 120 may present a graphical user interface that only includes selectable options to transfer resources that are maintained by the server computer system 120. For example, it may be that no gift cards are transferable to complete a pay-by-bank request and as such only resources from a chequing account maintained by the server computer system 120 may be available to complete the pay-by-bank request.

Figure 6:
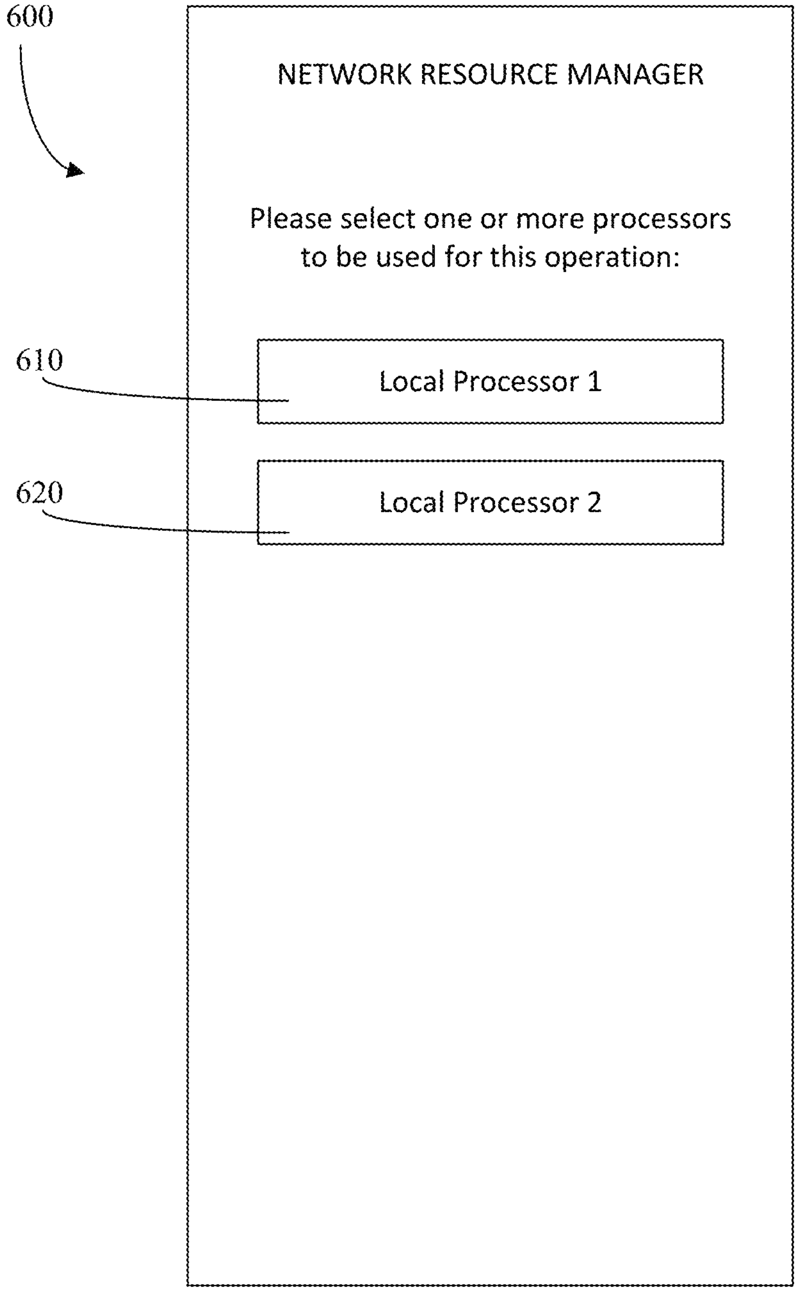
FIGS. 6 to 17 are example graphical user interfaces for indicating the transferability of resources according to various embodiments.
Figure 7:
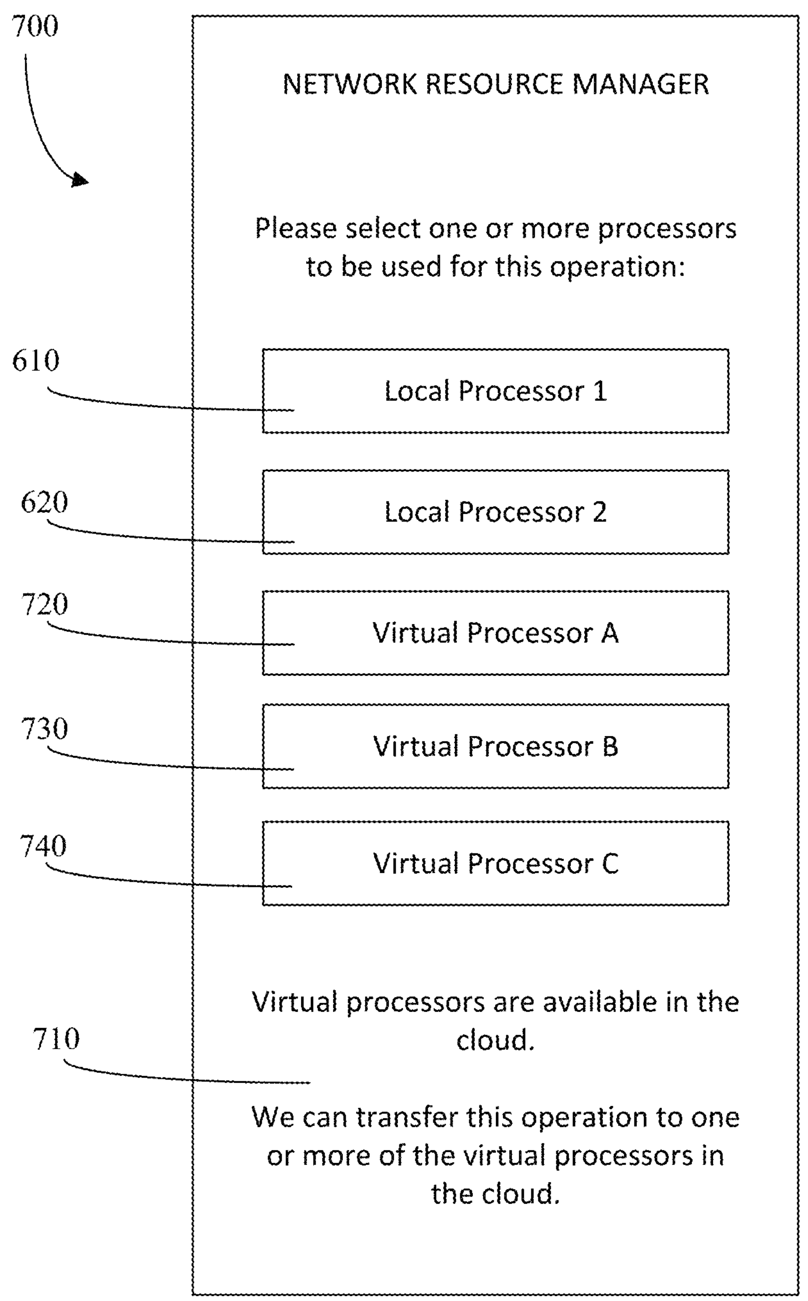

An example graphical user interface updated in accordance with embodiments described herein will now be described with reference to FIGS. 6 and 7. FIG. 6 shows a graphical user interface 600 that may be displayed on the client device 110 and may enable communication between the client device 110 and the server computer system 120. The graphical user interface 600 may be used to select one or more processors for performing an operation. Specifically, the graphical user interface 600 includes a first selectable option 610 for selecting a first local processor and a second selectable option 620 for selecting a second local processor.

The server computer system 120 may perform operations to determine that resources are transferable to perform the operation, as described herein with reference to the method 500. As such, the server computer system 120 may update the graphical user interface 600 to indicate that resources are available to be transferred. An updated graphical user interface 700 is shown in FIG. 7. As can be seen, the graphical user interface 700 has been updated to include a message 710 that indicates that virtual processors are available in the cloud. In addition to the selectable options 610, 620 to select local processors, the graphical user interface 700 includes selectable options 720, 730 and 740 to select one or more virtual processors to complete the operation. The user may select one or more of the selectable options by performing, for example, a tap gesture at a location on a display screen of the client device 110 that corresponds to the location of the selectable option associated with the selectable option and in response the server computer system 120 may perform operations to transfer the operation to one or more of the selected processors.

Example user interfaces that may be displayed in accordance with embodiments described herein are shown in FIGS. 8 to 15.

Figure 8:
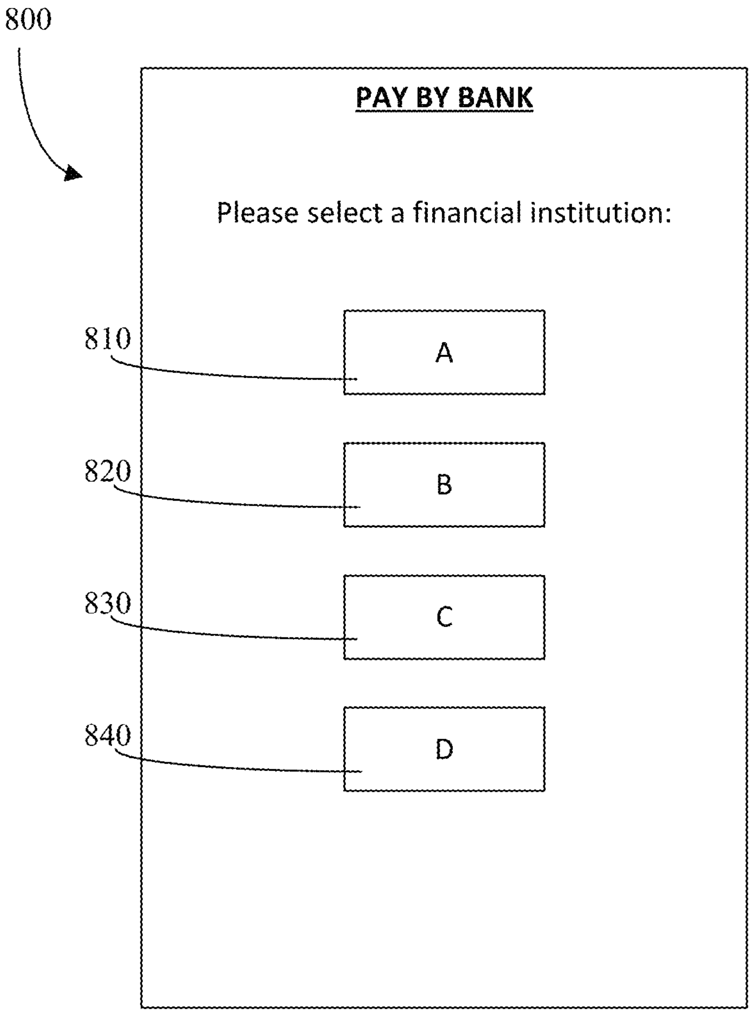

FIG. 8 includes a graphical user interface 800 that may be displayed on the client device 110. As can be seen, the graphical user interface 800 includes selectable options 810, 820, 830 and 840 to select a particular financial institution. The user operating the client device 110 may select their financial institution by performing, for example, a tap gesture at a location on a display screen of the client device 110 that corresponds to the location of the selectable option associated with their financial institution. In response to selection of the selectable option, the third party server computer system 130 may perform operations to handoff the session to the server computer system 120. The graphical user interface 800 may be displayed on the client device 110 prior to handoff of the session from the third party server computer system 130 to the server computer system 120.

Figure 9:
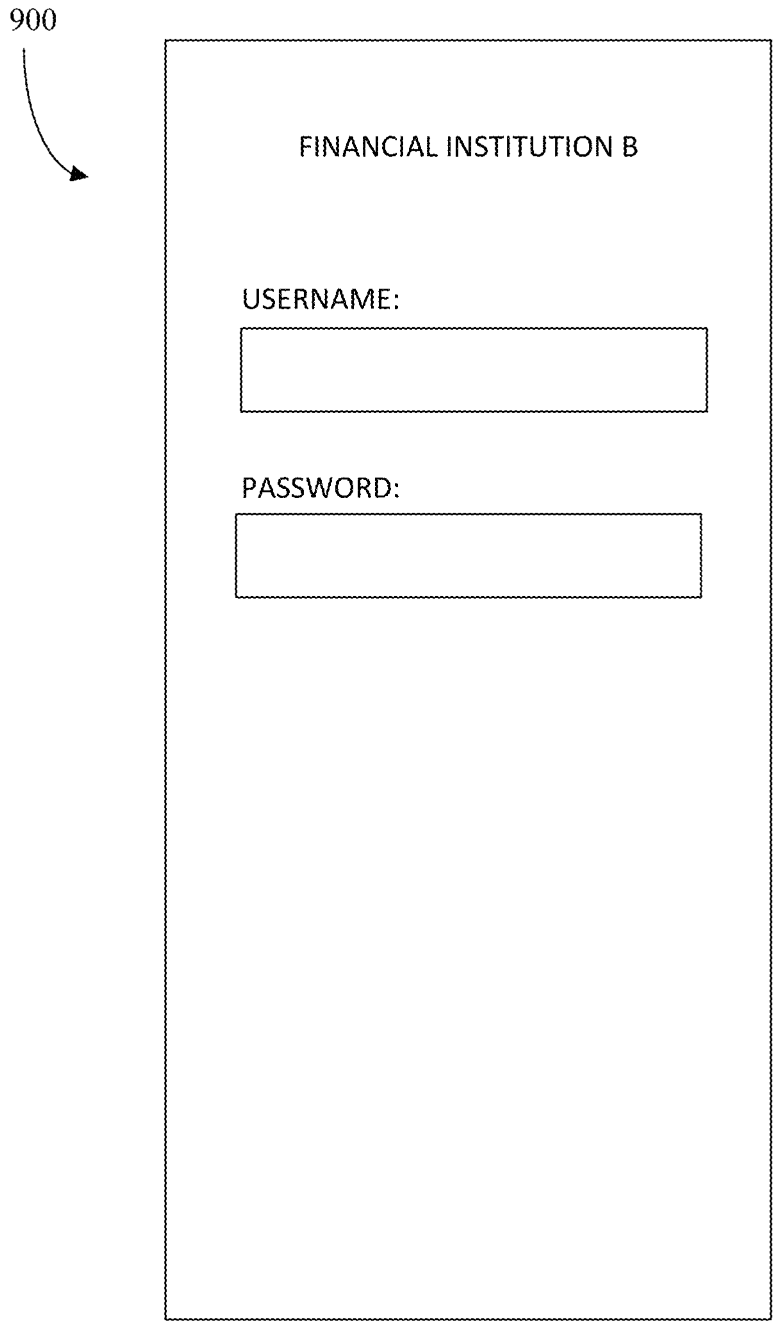

FIG. 9 includes a graphical user interface 900 that may be displayed on the client device 110 requesting authentication information, specifically a username and a password. The server computer system 120 may cause the client device 110 to display the graphical user interface 900 and this may be done in response to a successful handoff of the session from the third party server computer system 130 to the server computer system 120. The user may provide the authentication information using an input device such as a virtual keyboard associated with the client device 110. In response to submission of the authentication information, the server computer system 120 may perform operations to authenticate the client device 110 and to identify one or more accounts associated therewith.

Figure 10:
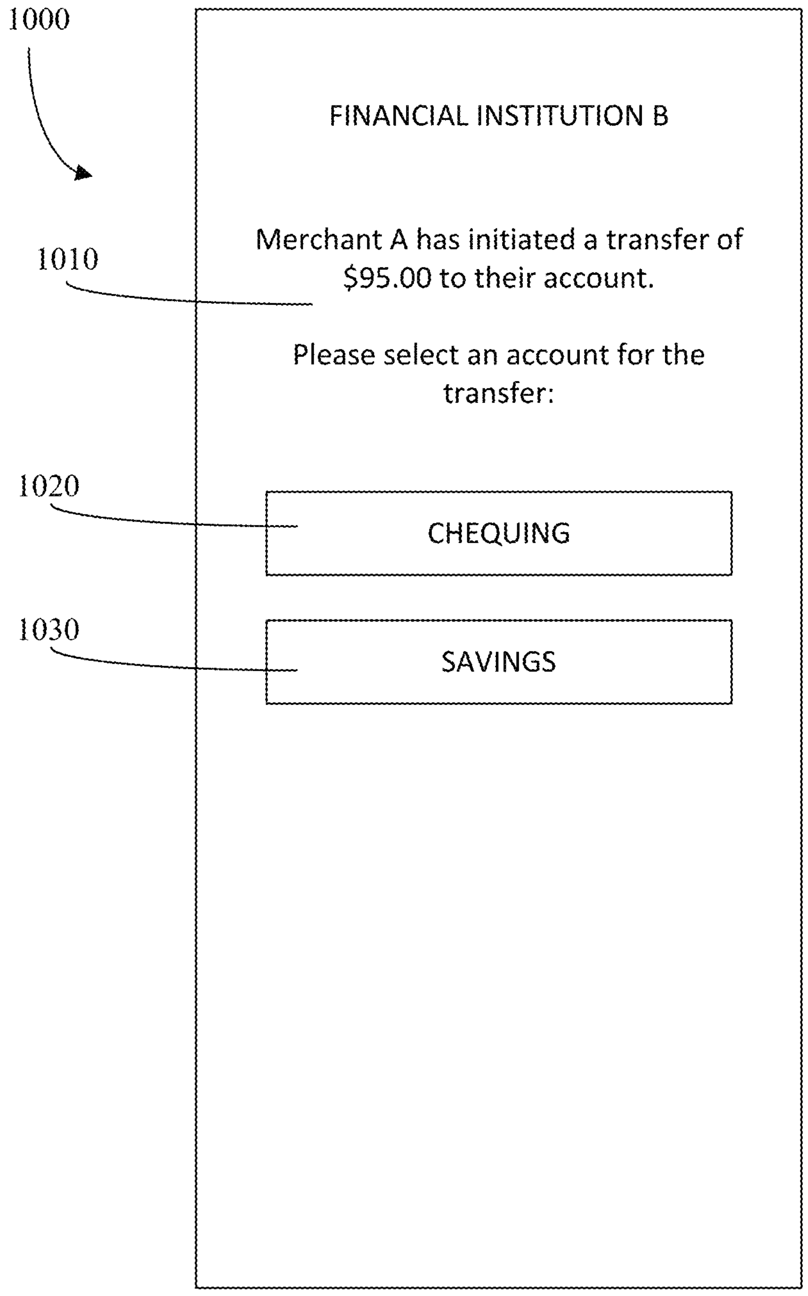

FIG. 10 includes an example graphical user interface 1000 that may be displayed on the client device 110 after successful authentication. As can be seen, the graphical user interface 1000 displays session data 1010. The session data 1010 includes a request to perform a pay-by-bank operation for a $95 purchase and identifies the Merchant A as the merchant. The graphical user interface 1000 includes a selectable option 1020 to complete the transfer using a chequing account maintained by the server computer system 120 and a selectable option 1030 to complete the transfer using a savings account. In this example, it may be that no resources provided by the resource provider are available to complete the transfer or that the user has not linked any accounts maintained by the resource provider. The user may select one of the selectable options by performing, for example, a tap gesture at a location on a display screen of the client device 110 that corresponds to the location of the selectable option associated with the desired account. In response to selection of one of the selectable options, the server computer system 120 may perform a pay-by-bank operation to complete the purchase using pay-by-bank.

Figure 11:
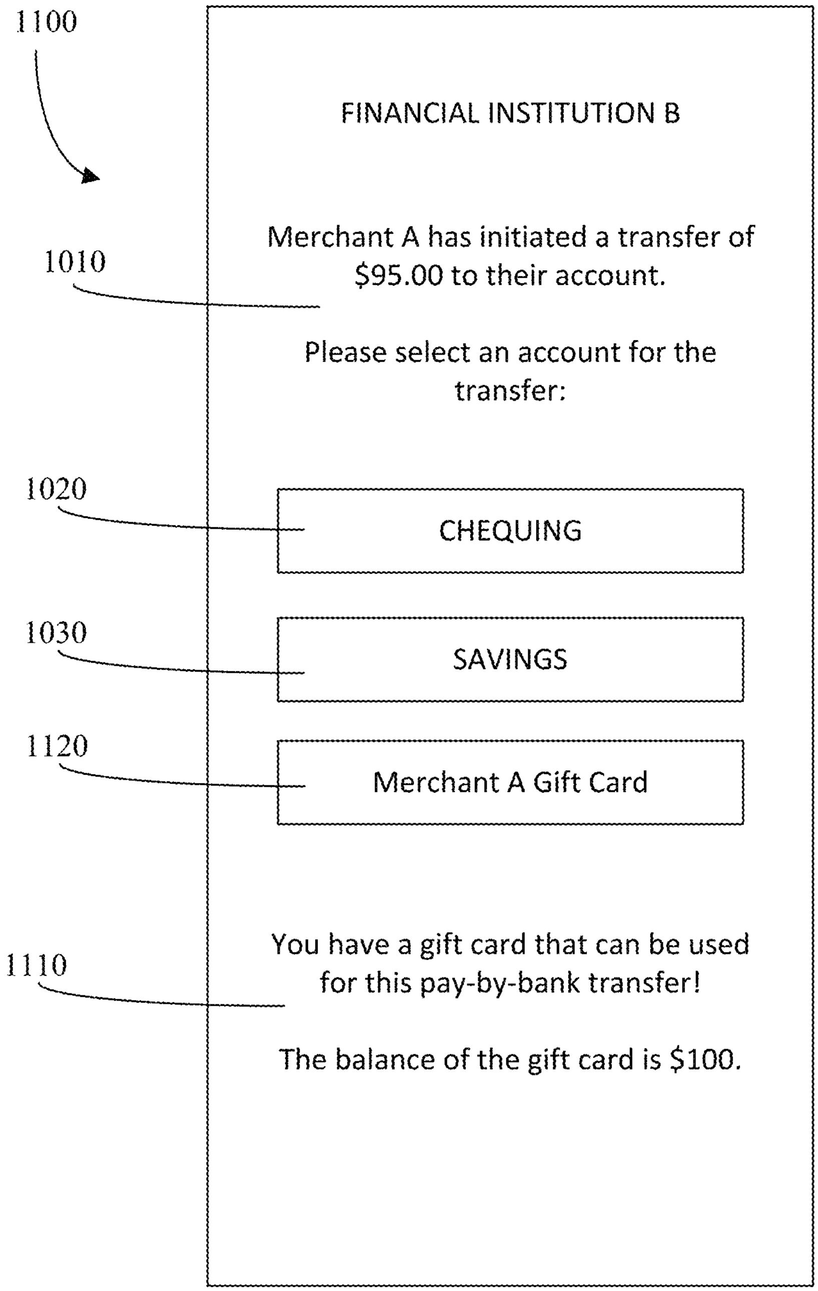

The server computer system 120 may perform operations to determine that resources are transferable to perform the operation, as described herein with reference to the method 500. Specifically, the server computer system 120 may determine that a gift card is available to be used at the merchant (Merchant A) identified in the session data. As such, the server computer system 120 may update the graphical user interface 600 to indicate that resources are available to be transferred. FIG. 11 includes an updated graphical user interface 1100. The graphical user interface 1100 has been updated to include a message 1110 that indicates that resources are transferable to complete a pay-by-bank operation. The message includes resource availability data indicating that $100 is available from the gift card. The graphical user interface 1100 includes a selectable option 1120 for selecting a gift card maintained by the resource provider to complete the pay-by-bank operation.

Figure 12:
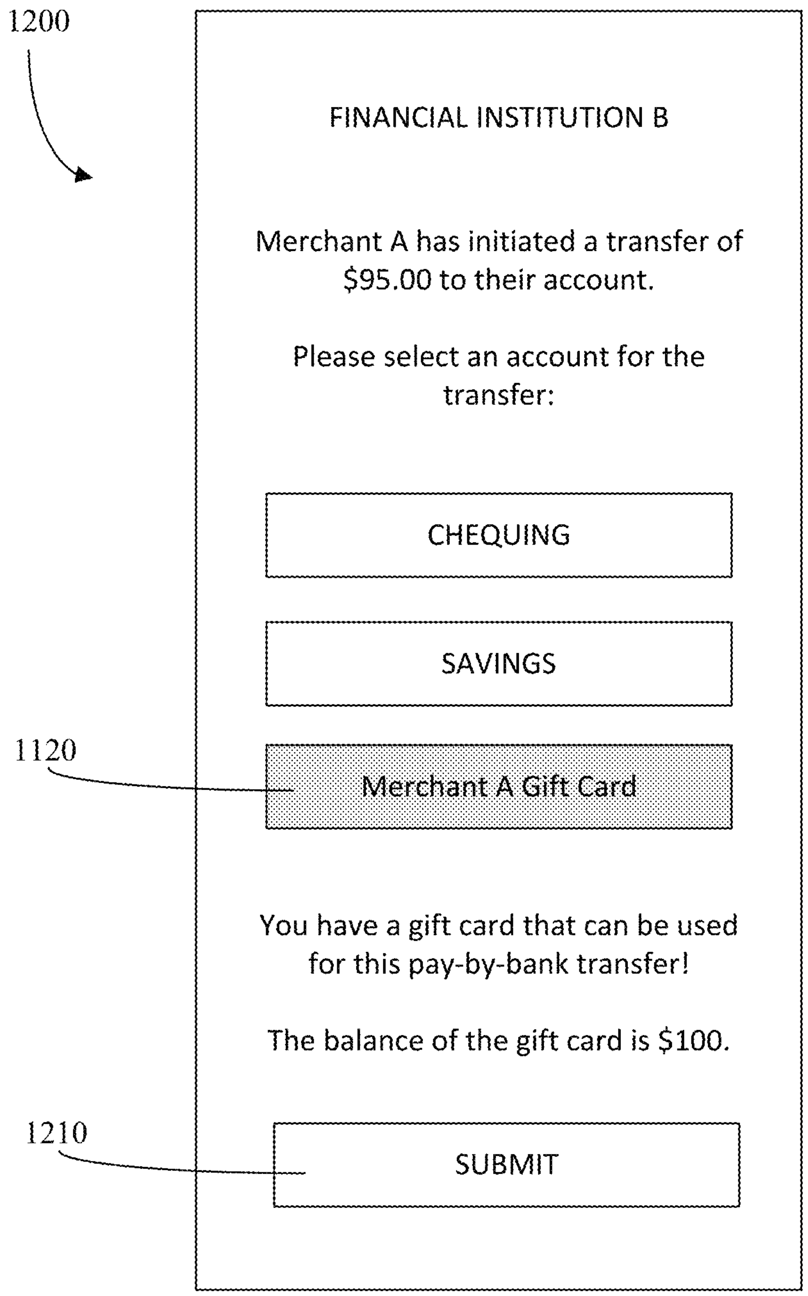

The user may select the selectable option 1120 and in response, the graphical user interface may be updated. An example updated graphical user interface 1200 is shown in FIG. 12. As can be seen, the graphical user interface 1200 has been updated to specify that the selectable option 1120 has been selected and to include a selectable option 1210 to complete the pay-by-bank operation. It will be appreciated that the selectable option 1210 to complete the pay-by-bank operation may only be displayed once one or more selectable options have been selected that have sufficient resource availability to complete the purchase. The user may select the selectable option 1210, the server computer system 120 may perform operations to complete the pay-by-bank operation using the gift card.

Figure 13:
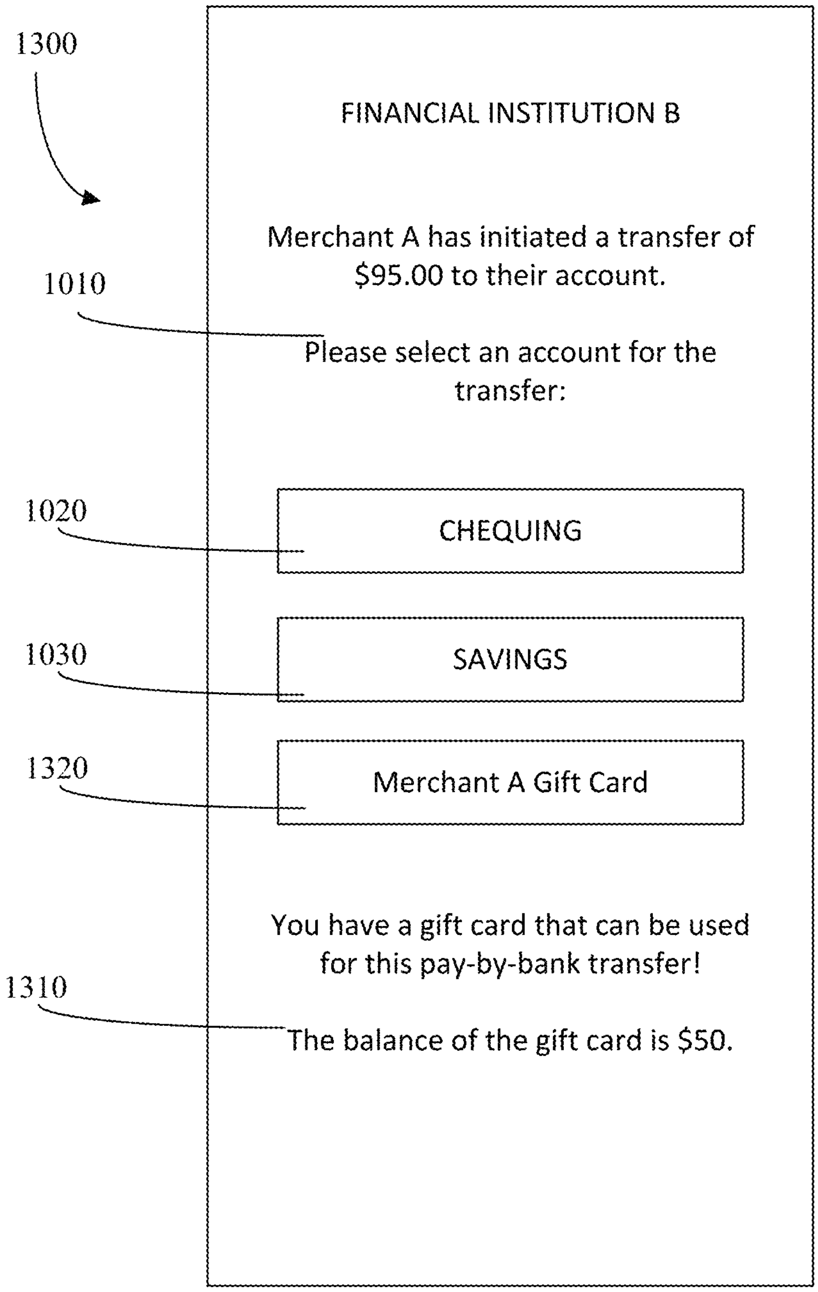

In the example shown in FIGS. 11 and 12, the gift card is shown to have sufficient funds for the entire purchase. It will be appreciated that in another example, the gift card may not have sufficient funds to complete the entire purchase and as such the server computer system 120 may update the graphical user interface to request that the user select one or more bank accounts to complete the remainder of the purchase. An example is described with reference to the graphical user interfaces shown in FIGS. 13 to 15. FIG. 13 shows an updated graphical user interface 1300 that is similar to the graphical user interface 1100 shown in FIG. 11. However, in this example, the gift card has a balance of $50 that is less than the amount requested ($95) and this is indicated in the message 1310. The graphical user interface 1300 includes a selectable option 1320 for selecting the gift card.

Figure 14:
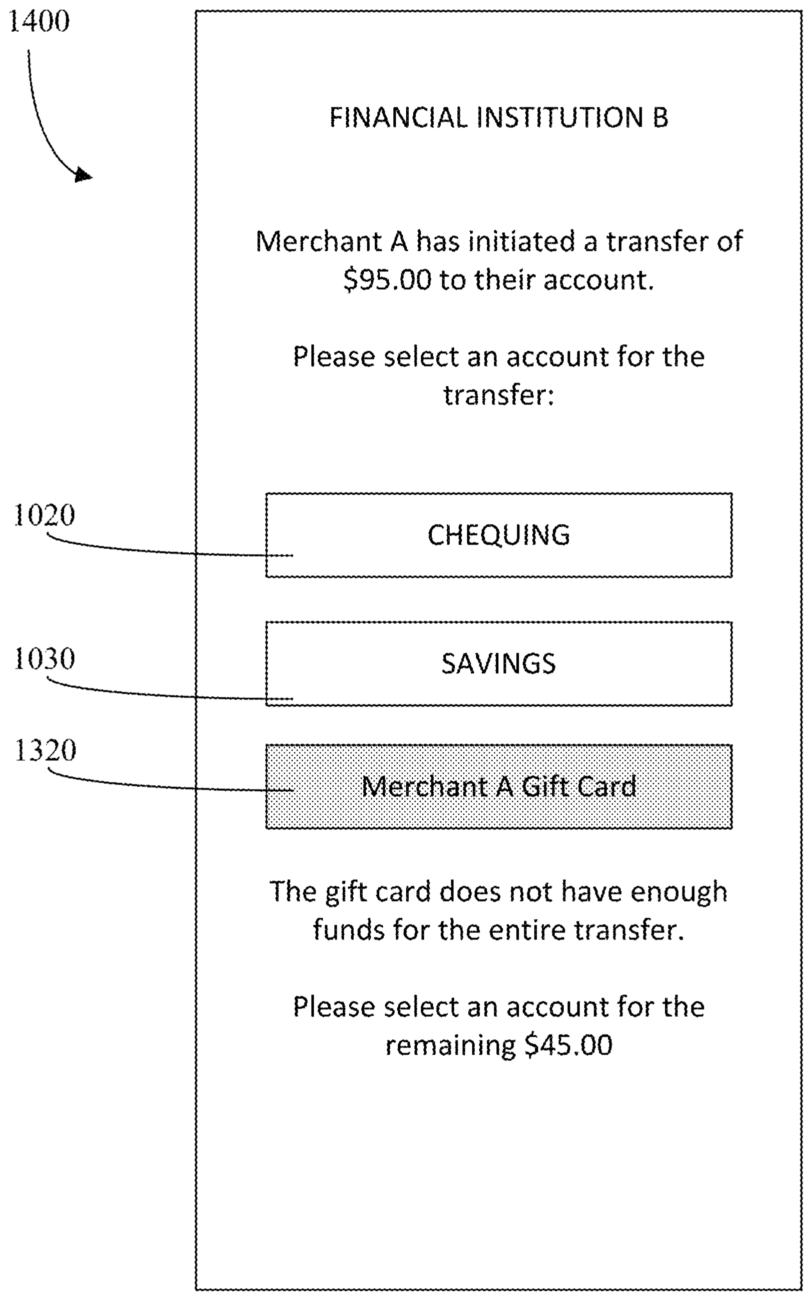

The user may select the selectable option 1320 and in response, the graphical user interface may be updated. An example updated graphical user interface 1400 is shown in FIG. 14. As can be seen, the graphical user interface 1400 has been updated to specify that the selectable option 1320 has been selected. A message 1410 is displayed indicating that the gift card does not have enough for the transfer and requesting that the user select one or more accounts for the remaining balance.

Figure 15:
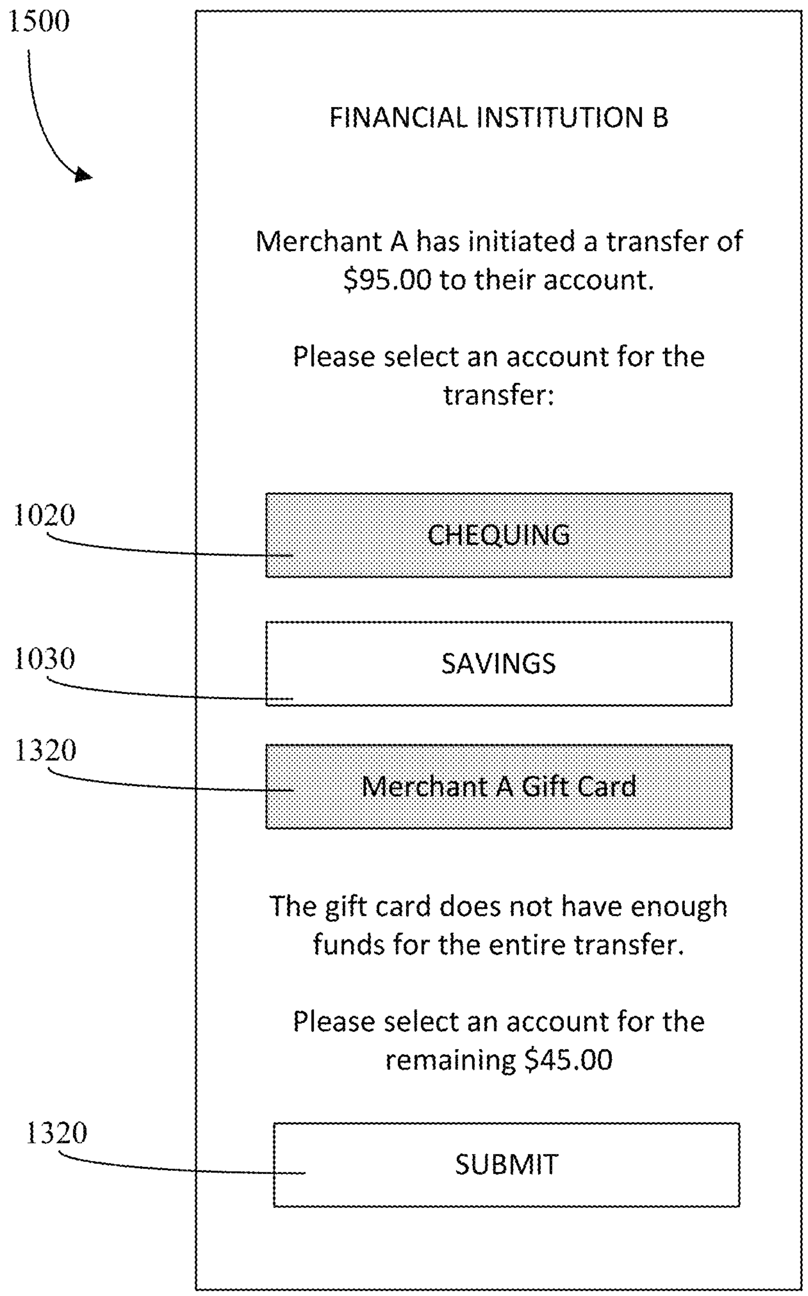

The user may select one of the selectable options 1020, 1030 for selecting an account for the remaining balance and in response, the graphical user interface may be updated. An example updated graphical user interface 1500 is shown in FIG. 15. As can be seen, the graphical user interface 1500 has been updated to specify that the chequing account has been selected for the remaining balance. The graphical user interface 1500 has been updated to include a selectable option 1510 to complete the pay-by-bank operation. It will be appreciated that the selectable option 1510 to complete the pay-by-bank operation may only be displayed once one or more selectable options have been selected that have sufficient resource availability to complete the purchase. The user may select the selectable option 1510, the server computer system 120 may perform operations to complete the pay-by-bank operation using the gift card and the selected account.

Figure 16:
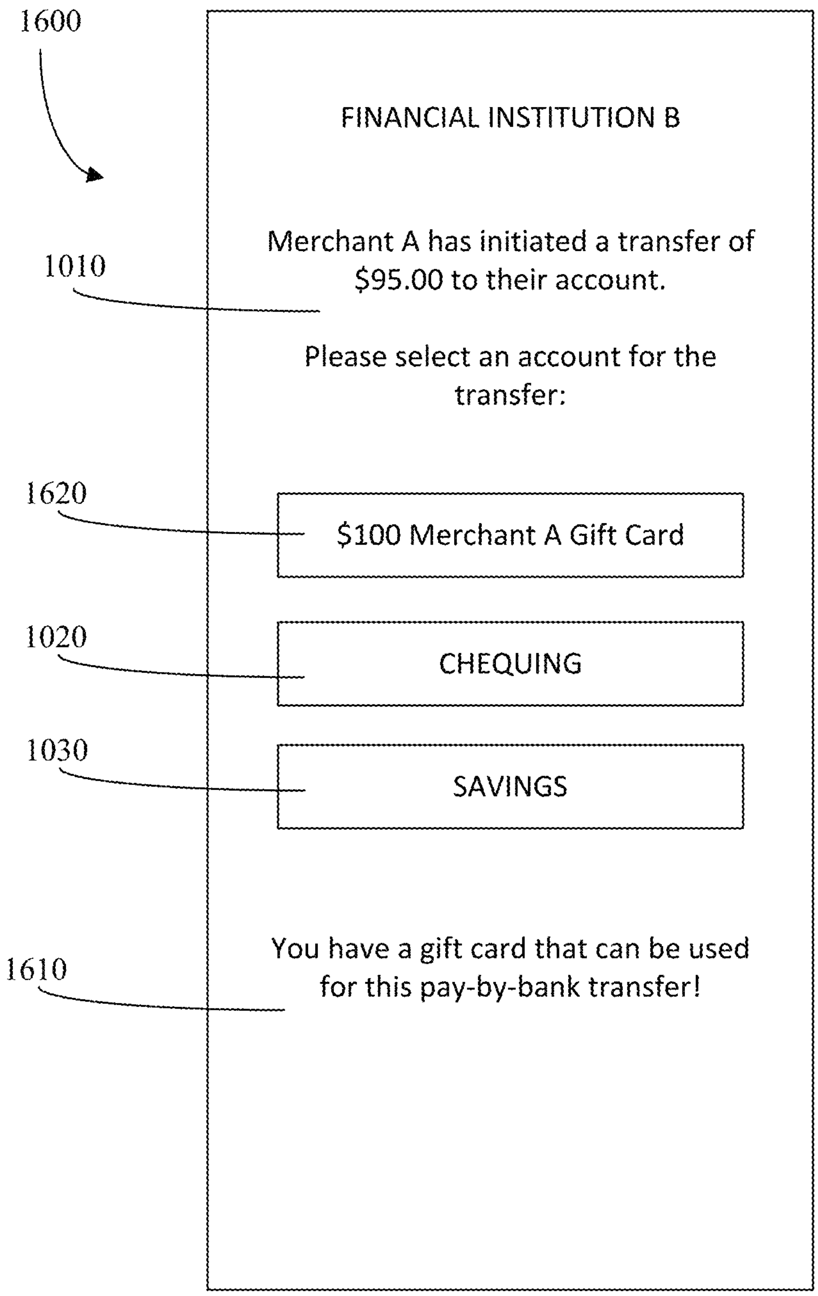

In one or more embodiments, the graphical user interface may be updated to rearrange selectable options and this may be done to prioritize one or more of the selectable options. An example updated graphical user interface 1600 is shown in FIG. 16. As can be seen, the graphical user interface 1600 has been updated (based on the graphical user interface 1000 shown in FIG. 10) to indicate that resources are available to perform the operation. Specifically, the graphical user interface 1600 has been updated to include a message 1610 that indicates that resources are transferable to complete a pay-by-bank operation. The message includes resource availability data indicating that $100 is available from the gift card. The graphical user interface 1100 includes a selectable option 1620 for selecting a gift card maintained by the resource provider to complete the pay-by-bank operation. The selectable option 1620 has, however, been positioned above the selectable options 1020 and 1030 and this may be done to prioritize selection of the selectable option 1620. Put another way, the graphical user interface 1600 has been updated to rearrange selectable options 1020 and 1030 and to position the selectable option 1620 at a top of the selectable options.

Figure 17:
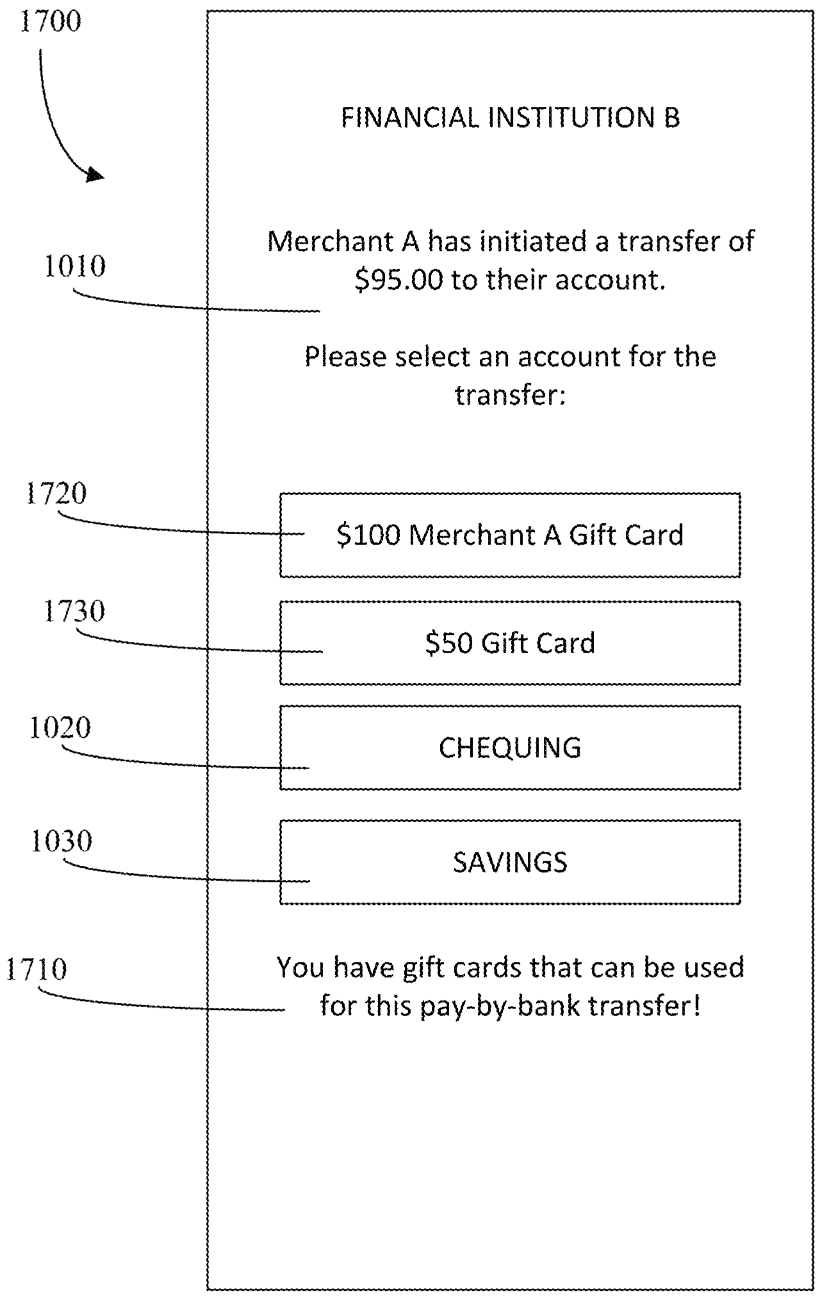

Another example updated graphical user interface 1700 is shown in FIG. 17. As can be seen, the graphical user interface 1700 has been updated (based on the graphical user interface 1000 shown in FIG. 10) to indicate that resources are available to perform the operation. Specifically, the graphical user interface 1700 has been updated to include a message 1710 that indicates that resources are transferable to complete a pay-by-bank operation. The message includes resource availability data indicating two different gift cards are available. The graphical user interface 1100 includes a selectable option 1720 for selecting a first gift card maintained by the resource provider and a selectable option 1730 for selecting a second gift card maintained by a different resource provider to complete the pay-by-bank operation. The selectable options 1720, 1730 have, however, been positioned above the selectable options 1020 and 1030 and this may be done to prioritize selection of the selectable options 1720, 1730. The selectable options 1720 and 1730 may themselves be arranged based on resource availability data. For example, selectable option 1720 may be associated with the gift card that has the highest balance. As another example, the selectable option 1720 may be associated with the gift card that has the lowest balance and this may be done to prioritize using up gift cards that have smaller balances. It will be appreciated that one or more of the gift cards may be used to complete the pay-by-bank operation.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system, comprising:

a processor;

a communications module coupled to the processor; and a memory coupled to the processor, the memory storing instructions that, when executed, configure the processor to:

receive, via the communications module and from a third party server computer system, session data that includes a request to perform an operation;

consult a database to determine that resources are transferable to the third party server computer system to perform the operation based at least on the session data and resource availability data; and responsive to determining that the resources are transferable to the third party server computer system to perform the operation, update a graphical user interface displayed on a client device to indicate that the resources are transferable to perform the operation.

2. The server computer system of claim 1, wherein the instructions, when executed, further configure the processor to:

obtain the resource availability data for resources maintained by a resource provider.

3. The server computer system of claim 2, wherein the instructions, when executed, further configure the processor to:

analyze the resource availability data to obtain an identifier associated with the resource availability data.

4. The server computer system of claim 2, wherein the resource availability data is obtained by way of an application programming interface associated with the resource provider.

5. The server computer system of claim 1, wherein the instructions, when executed, further configure the processor to:

analyze the session data to obtain an identifier associated with the session data.

6. The server computer system of claim 1, wherein the session data is received by way of an application programming interface redirect initiated by the third party server computer system.

7. The server computer system of claim 1, wherein the instructions, when executed, further configure the processor to:

receive, from the client device, a signal that includes an identifier for obtaining the resource availability data from the resource provider.

8. The server computer system of claim 1, wherein when updating the graphical user interface displayed on the client device to indicate that the resources are transferable to perform the operation, the instructions, when executed, further configure the processor to:

enable a selectable option for transferring the resources to perform the operation.

9. The server computer system of claim 1, wherein the instructions, when executed, further configure the processor to:

responsive to receiving the session data that includes the request to perform the operation, obtain the resource availability data from the resource provider to determine that resources are available to perform the operation.

10. The server computer system of claim 1, wherein the request to perform the operation includes a request to transfer resources to an account that is associated with the third party server computer system.

11. The server computer system of claim 1, wherein the request to perform the operation includes a pay-by-bank request.

12. A computer-implemented method, comprising:

receiving, from a third party server computer system, session data that includes a request to perform an operation;

consulting a database to determine that resources are transferable to the third party server computer system to perform the operation based at least on the session data and resource availability data; and responsive to determining that the resources are transferable to the third party server computer system to perform the operation, updating a graphical user interface displayed on a client device to indicate that the resources are transferable to perform the operation.

13. The computer-implemented method of claim 12, further comprising:

obtaining the resource availability data for resources maintained by a resource provider.

14. The computer-implemented method of claim 13, further comprising:

analyzing the resource availability data to obtain an identifier associated with the resource availability data.

15. The computer-implemented method of claim 13, wherein the resource availability data is obtained by way of an application programming interface associated with the resource provider.

16. The computer-implemented method of claim 12, further comprising:

receiving, from the client device, a signal that includes an identifier for obtaining the resource availability data from the resource provider.

17. The computer-implemented method of claim 12, wherein when updating the graphical user interface displayed on the client device to indicate that the resources are transferable to perform the operation, the method further comprises:

enabling a selectable option for transferring the resources to perform the operation.

18. The computer-implemented method of claim 12, further comprising:

responsive to receiving the session data that includes the request to perform the operation, obtaining updated resource availability data from the resource provider to determine that resources are available to perform the operation.

19. The computer-implemented method of claim 12, wherein the request to perform the operation includes a request to transfer resources to an account that is associated with the third party server computer system.

20. A non-transitory computer readable storage medium comprising processor-executable instructions which, when executed, configure a processor to:

receive, via the communications module and from a third party server computer system, session data that includes a request to perform an operation;

consult a database to determine that resources are transferable to the third party server computer system to perform the operation based at least on the session data and resource availability data; and responsive to determining that the resources are transferable to the third party server computer system to perform the operation, update a graphical user interface displayed on a client device to indicate that the resources are transferable to perform the operation.

* * * * *